(12) United States Patent
Chan et al.

(10) Patent No.: US 9,223,444 B2
(45) Date of Patent: Dec. 29, 2015

(54) CMOS IMAGE SENSOR WITH SHARED MULTIPLEXER AND METHOD OF OPERATING THE SAME

(71) Applicant: PixArt Imaging Inc., Hsin-Chu (TW)

(72) Inventors: Wei-Ting Chan, Hsin-Chu (TW); Ming-Tsan Kao, Hsin-Chu (TW); En-Feng Hsu, Hsin-Chu (TW)

(73) Assignee: PixArt Imaging Inc., Science-Based Industrial Park, Hsin-Chu (TW)

(*) Notice: Subject to any disclaimer, the term of this patent is extended or adjusted under 35 U.S.C. 154(b) by 0 days.

(21) Appl. No.: 13/733,109

(22) Filed: Jan. 2, 2013

(65) Prior Publication Data

US 2013/0120626 A1 May 16, 2013

Related U.S. Application Data

(63) Continuation of application No. 12/620,595, filed on Nov. 18, 2009, now abandoned.

(30) Foreign Application Priority Data

May 21, 2009 (TW) ............................... 098116850 A
Sep. 21, 2009 (TW) ............................... 098131751 A

(51) Int. Cl.
*G06F 3/042* (2006.01)
*H04N 5/345* (2011.01)
*H04N 5/376* (2011.01)
*H04N 5/335* (2011.01)

(52) U.S. Cl.
CPC .............. *G06F 3/0425* (2013.01); *G06F 3/042* (2013.01); *G06F 3/0428* (2013.01); *H04N 5/3454* (2013.01); *H04N 5/376* (2013.01); *H04N 5/335* (2013.01)

(58) Field of Classification Search
None
See application file for complete search history.

(56) References Cited

U.S. PATENT DOCUMENTS

| 6,864,920 | B1 | 3/2005 | Kindt | |
|---|---|---|---|---|
| 2005/0012836 | A1 | 1/2005 | Guidash | |
| 2005/0117017 | A1* | 6/2005 | Baer | 348/87 |
| 2006/0087565 | A1 | 4/2006 | Okamoto | |
| 2006/0119903 | A1 | 6/2006 | Chiba | |
| 2006/0203112 | A1* | 9/2006 | Aoki | 348/294 |
| 2006/0220933 | A1* | 10/2006 | Yamada | 341/76 |
| 2008/0095459 | A1 | 4/2008 | Vitsnudel | |

(Continued)

FOREIGN PATENT DOCUMENTS

CN 1823532 A 8/2006
CN 101383367 A 3/2009

(Continued)

*Primary Examiner* — Justin P Misleh
(74) *Attorney, Agent, or Firm* — Winston Hsu; Scott Margo

(57) ABSTRACT

A CMOS image sensor includes a pixel array unit, a row selection unit, and a logic circuit. The pixel array unit is used for sensing an object. The pixel array unit includes M pixels and P multiplexers and each of the M pixels is electrically connected to one of the P multiplexers, wherein M is a positive integer and P is a positive integer smaller than M. The row selection unit and the logic circuit are electrically connected to the P multiplexers. The row selection unit is used for generating a row selection signal. The logic circuit is used for determining a sensing region corresponding to the object wherein the sensing region includes N of the M pixels. Furthermore, the logic circuit controls Q multiplexers, which are electrically connected to the N pixels, to transmit the row selection signal to the N pixels.

9 Claims, 19 Drawing Sheets

(56) References Cited

U.S. PATENT DOCUMENTS

| | | | |
|---|---|---|---|
| 2008/0258047 A1* | 10/2008 | Sakakibara et al. | 250/214 C |
| 2008/0285808 A1* | 11/2008 | Chang et al. | 382/107 |
| 2009/0027526 A1* | 1/2009 | Li et al. | 348/272 |
| 2010/0095205 A1* | 4/2010 | Kinoshita | G06F 3/0416 715/702 |
| 2011/0074734 A1* | 3/2011 | Wassvik et al. | 345/175 |
| 2012/0146938 A1* | 6/2012 | Worfolk et al. | 345/174 |

FOREIGN PATENT DOCUMENTS

| | | |
|---|---|---|
| JP | 2004318819 A | 11/2004 |
| JP | 2009100108 A | 5/2009 |
| JP | 2010122936 A | 6/2010 |
| TW | 200917103 | 4/2009 |

* cited by examiner

CMOS IMAGE SENSOR WITH SHARED MULTIPLEXER AND METHOD OF OPERATING THE SAME

CROSS REFERENCE TO RELATED APPLICATIONS

This is a Continuation application of Ser. No. 12/620,595, now pending, filed on Nov. 18, 2009.

BACKGROUND OF THE INVENTION

1. Field of the Invention

The invention relates to a complementary metal oxide semiconductor (CMOS) image sensor and a method of operating the same and, more particularly, to a CMOS image sensor and a method of operating the same capable of improving fabrication yield rate through self-calibration.

2. Description of the Prior Art

Since image sensors have been developed well and image processing speed has been improved, people have paid much attention to optical touch screen. So far the image sensor is divided into a charge coupled device (CCD) image sensor and CMOS image sensor. In general, the CCD image sensor has less noise and better image quality than the CMOS sensor. However, signal processing circuits of the CMOS image sensor can be integrated into single chip so as to minimize electronic device. Furthermore, the CMOS image sensor has lower power consumption than the CCD image sensor, so it has become more and more popularly.

Referring to FIG. 1, FIG. 1 is a schematic diagram illustrating an optical touch screen 1 of the prior art. As shown in FIG. 1, the optical touch screen 1 comprises a touch panel 10 and two CMOS image sensors 12 and 14. The CMOS image sensors 12 and 14 are respectively disposed at both sides of the touch panel 10. When a user uses an object 16, such as finger, stylus, or the like, to operate the touch panel 10, the CMOS image sensors 12 and 14 will sense a projection of the object 16. Afterward, if an angle between the projection and the touch position is known and a distance between the two CMOS image sensors 12 and 14 can be obtained, a coordinate of the touch position can be then calculated.

Referring to FIGS. 2 and 3, FIG. 2 is a schematic diagram illustrating a moving trajectory 160 of the object 16 projected on the CMOS image sensor 12 shown in FIG. 1, and FIG. 3 is a schematic diagram illustrating a moving trajectory 160' of the object 16 projected on the CMOS image sensor 12 shown in FIG. 1. For example, if the CMOS image sensor 12 is attached to the touch panel 10 without deviation or obliqueness, the moving trajectory 160 of the object 16, which is projected on a pixel array unit 120 of the CMOS image sensor 12, has a rectangular shape, as shown in FIG. 2. However, if the CMOS image sensor 12 is attached to the touch panel 10 with deviation or obliqueness due to assembly tolerance, the moving trajectory 160' of the object 16, which is projected on the pixel array unit 120 of the CMOS image sensor 12, has an oblique shape, as shown in FIG. 3. If the moving trajectory 160' of the object 16 is oblique, the read-out circuit 122 needs to read more pixel data for following algorithm so as to eliminate the influence of assembly tolerance. Consequently, operating frequency and power consumption of the system will increase a lot.

SUMMARY OF THE INVENTION

An objective of the invention is to provide a CMOS image sensor and a method of operating the same capable of improving fabrication yield rate through self-calibration so as to solve the aforesaid problems.

According to an embodiment of the invention, the CMOS image sensor comprises a pixel array unit, a row selection unit and a logic circuit. The pixel array unit is used for sensing an object. The pixel array unit comprises M pixels and P multiplexers. Each of the M pixels is electrically connected to one of the P multiplexers wherein M is a positive integer and P is a positive integer smaller than M. The row selection unit and the logic circuit are electrically connected to the P multiplexers. The row selection unit is used for generating a row selection signal. The logic circuit is used for determining a sensing region corresponding to the object. The sensing region comprises N of the M pixels and N is a positive integer smaller than or equal to M. The logic circuit further controls Q multiplexers, which are electrically connected to the N pixels, to transmit the row selection signal to the N pixels wherein Q is a positive integer smaller than or equal to N and smaller than or equal to P.

According to another embodiment of the invention, the method of operating the CMOS image sensor comprises steps of: sensing an object by a pixel array unit wherein the pixel array unit comprises M pixels and P multiplexers, each of the M pixels is electrically connected to one of the P multiplexers, M is a positive integer, and P is a positive integer smaller than M; determining a sensing region corresponding to the object wherein the sensing region comprises N of the M pixels and N is a positive integer smaller than or equal to M; generating a row selection signal; and controlling Q multiplexers, which are electrically connected to the N pixels, to transmit the row selection signal to the N pixels wherein Q is a positive integer smaller than or equal to N and smaller than or equal to P.

According to another embodiment of the invention, the CMOS image sensor comprises a pixel array unit, a row selection unit, a read-out circuit and a logic circuit. The read-out circuit and the row selection unit are electrically connected to the pixel array unit. The logic circuit is electrically connected to the read-out circuit. The pixel array unit is used for sensing an object and comprises M pixels, wherein M is a positive integer. The row selection unit is used for generating a row selection signal wherein the row selection signal controls the M pixels to output signals. The read-out circuit is used for reading signals generated by the M pixels. The logic circuit is used for determining a sensing region corresponding to the object wherein the sensing region comprises N of the M pixels and N is a positive integer smaller than or equal to M. Afterward, the logic circuit determines a first pixel and a last pixel for each row within the sensing region and controls the read-out circuit to read the first pixel through the last pixel of each row in row-major order, so as to output signals generated by the N pixels.

According to another embodiment of the invention, the method of operating the CMOS image sensor comprises steps of: sensing an object by a pixel array unit wherein the pixel array unit comprises M pixels and M is a positive integer; determining a sensing region corresponding to the object wherein the sensing region comprises N of the M pixels and N is a positive integer smaller than or equal to M; generating a row selection signal for controlling the M pixels to output signals; determining a first pixel and a last pixel for each row within the sensing region; reading the first pixel through the last pixel of each row in row-major order; and outputting signals generated by the N pixels.

Therefore, according to the CMOS image sensor and the method of operating the same mentioned in the above, the invention only needs to output pixel data within the sensing region to eliminate the influence of assembly tolerance, so as to reduce operating frequency and power consumption substantially.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
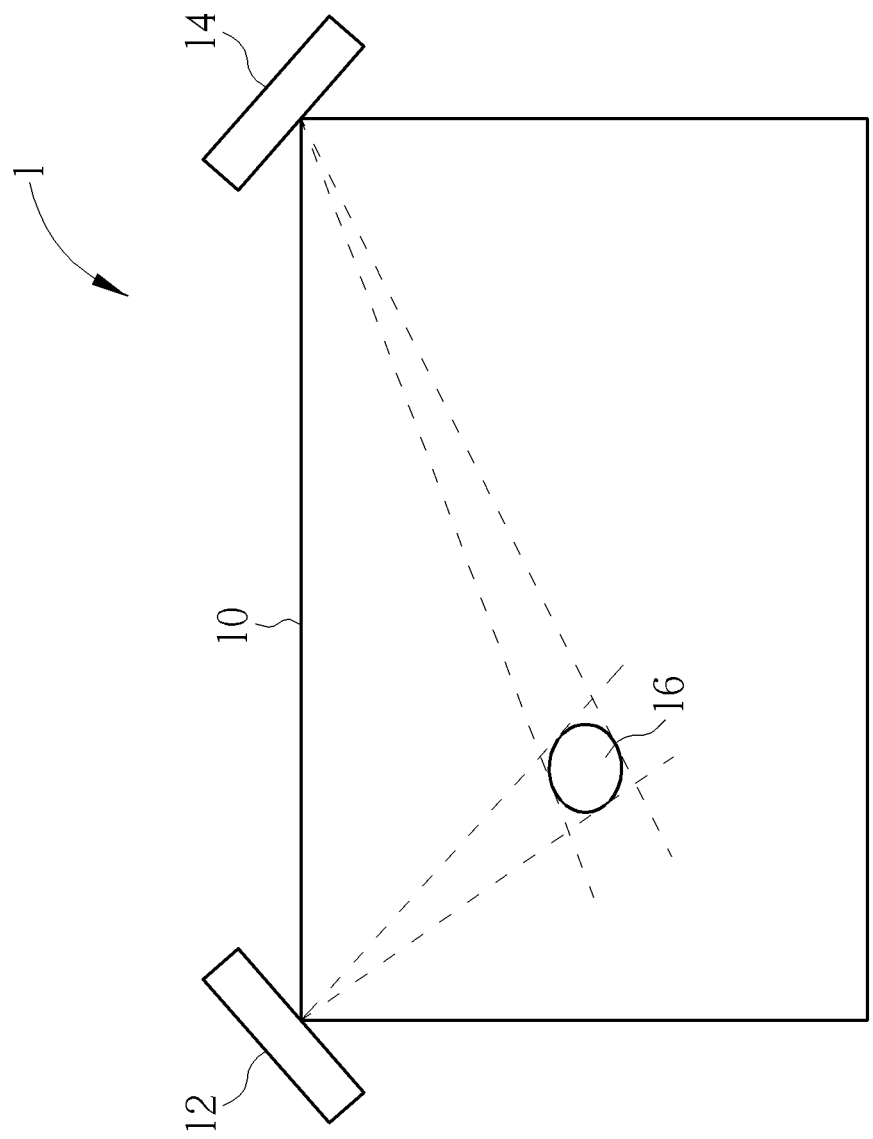
FIG. 1 is a schematic diagram illustrating an optical touch screen of the prior art.
Figure 2:
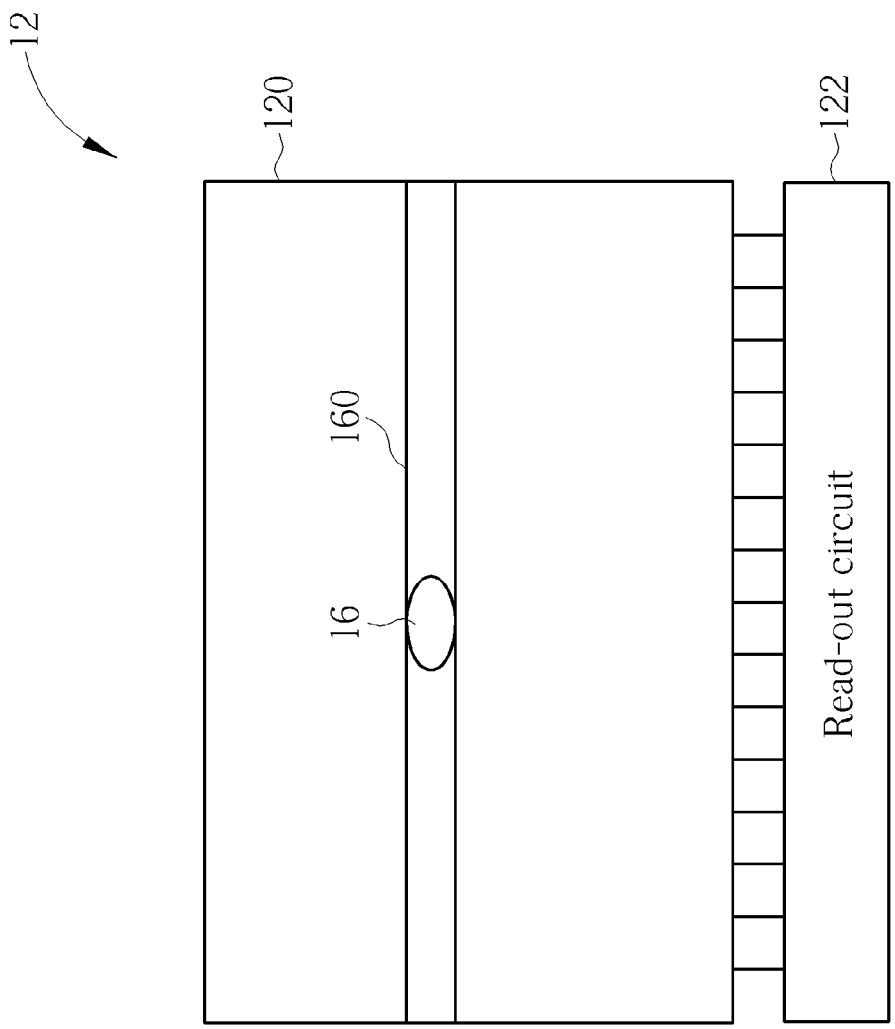
FIG. 2 is a schematic diagram illustrating a moving trajectory of the object projected on the CMOS image sensor shown in FIG. 1.
Figure 3:
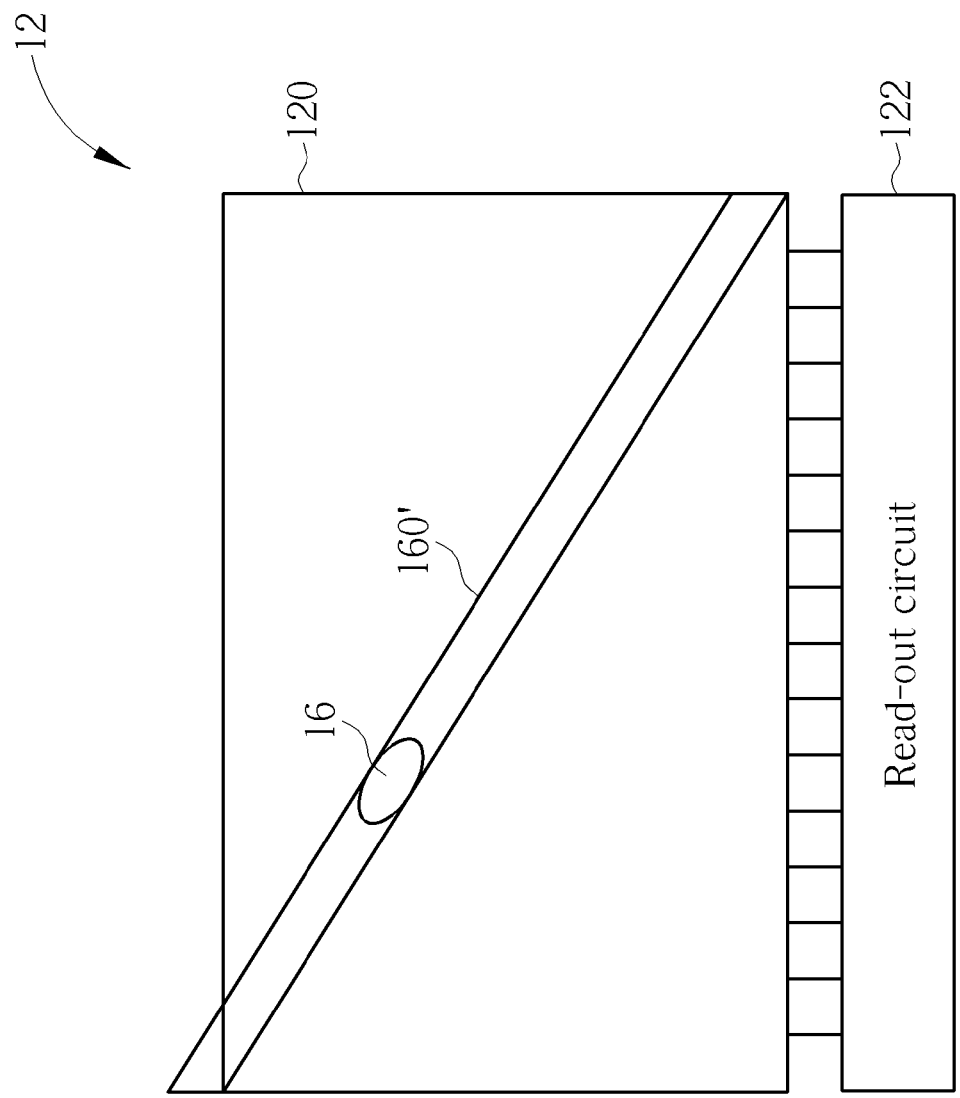
FIG. 3 is a schematic diagram illustrating a moving trajectory of the object projected on the CMOS image sensor shown in FIG. 1.
Figure 4:
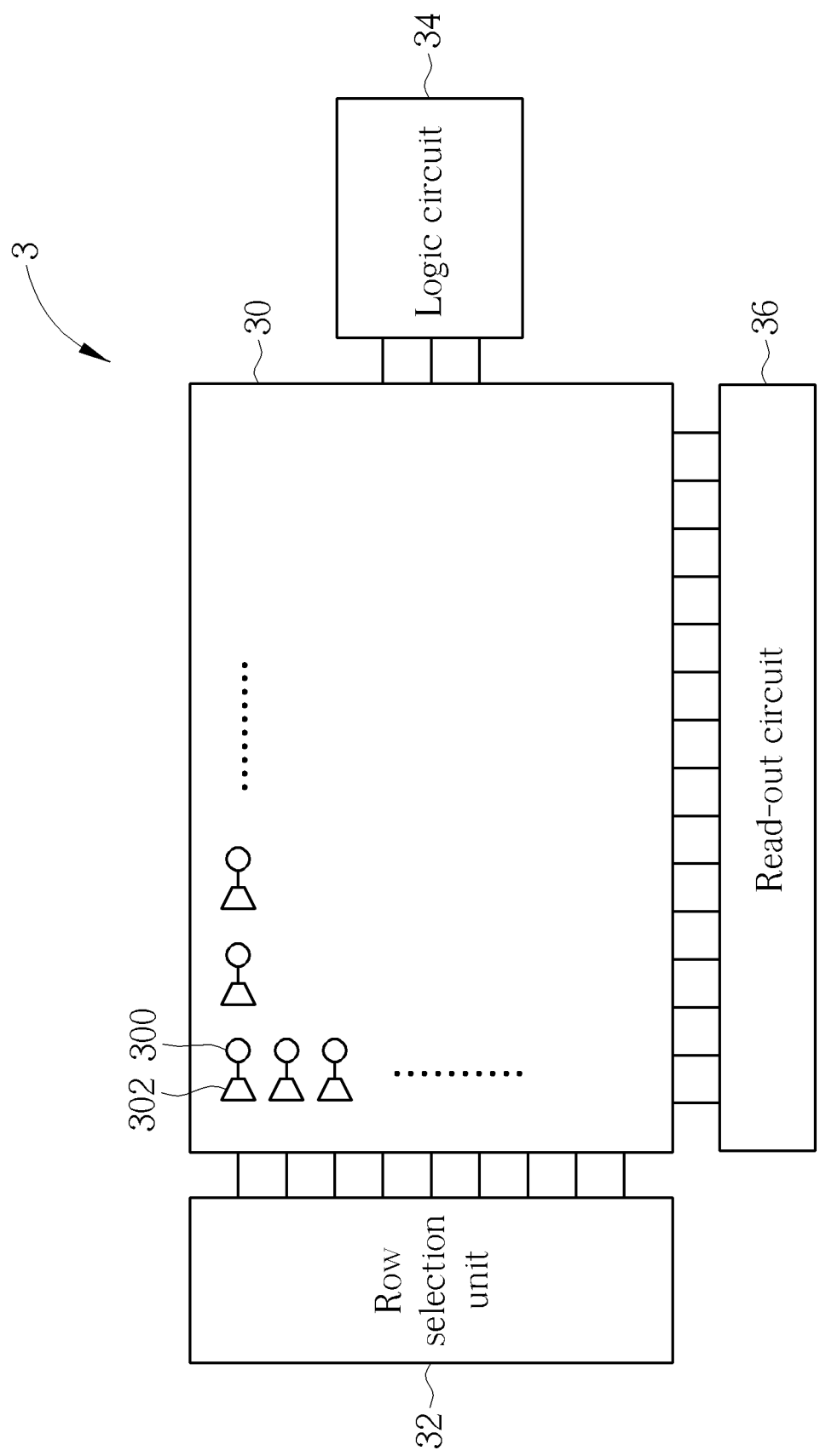
FIG. 4 is a schematic diagram illustrating a CMOS image sensor according to an embodiment of the invention.

Referring to FIG. 4, FIG. 4 is a schematic diagram illustrating a CMOS image sensor 3 according to an embodiment of the invention. As shown in FIG. 4, the CMOS image sensor 3 comprises a pixel array unit 30, a row selection unit 32, a logic circuit 34 and a read-out circuit 36. The row selection unit 32, the logic circuit 34 and the read-out circuit 36 are electrically connected to the pixel array unit 30.

The pixel array unit 30 is used for sensing an object (not shown) or a moving trajectory thereof. In this embodiment, the pixel array unit 30 comprises M pixels 300 and P multiplexers 320 wherein each of the M pixels 300 is electrically connected to one of the P multiplexers 302, M is a positive integer, and P is a positive integer smaller than or equal to M. For further description, if P is equal to M, an amount of the pixels 300 is the same as that of the multiplexers 302 and each multiplexer 302 is electrically connected to a unique pixel 300. On the other hand, if P is smaller than M, an amount of the multiplexers 302 is less than that of the pixels 300 and each multiplexer 302 is electrically connected to at least one pixel 300. The pixel array unit 30 shown in FIG. 4 comprises the same amount of pixels 300 and multiplexers 302 for illustrative purpose. For example, if the pixel array unit 30 has a 640*480 pixel array and an amount of the pixels 300 is the same as that of multiplexers 302, both M and P are equal to 640*480. In other words, the pixel array unit 30 comprises 640*480 pixels 300 and 640*480 multiplexers 302. In addition, the pixel 300 can absorb light reflected from an object and then transform the absorbed light into an electric signal. The pixel 300 usually consists of transistors and photo diodes. It should be noted that the structure and principle of the pixel 300 can be easily achieved by one skilled in the art and thus will not be described in detail here.

The row selection unit 32 receives a time sequence signal and a control signal from a controller (not shown) and then generates a row selection signal. The row selection signal is used for controlling the pixels 300 of the pixel array unit 30 to output data. The logic circuit 34 is used for determining a sensing region corresponding to an object or a moving trajectory sensed by the pixel array unit 30. The sensing region comprises N of the M pixels 300 wherein N is a positive integer smaller than or equal to M. Afterward, the logic circuit 34 controls Q multiplexers 302, which are electrically connected to the N pixels 300, to transmit the row selection signal to the N pixels 300 wherein Q is a positive integer smaller than or equal to N and smaller than or equal to P. For example, in the pixel array unit 30 shown in FIG. 4, Q is equal to N and smaller than P. The read-out circuit 36 is used for reading signals generated by the N pixels 300 of the sensing region.

Figure 5:
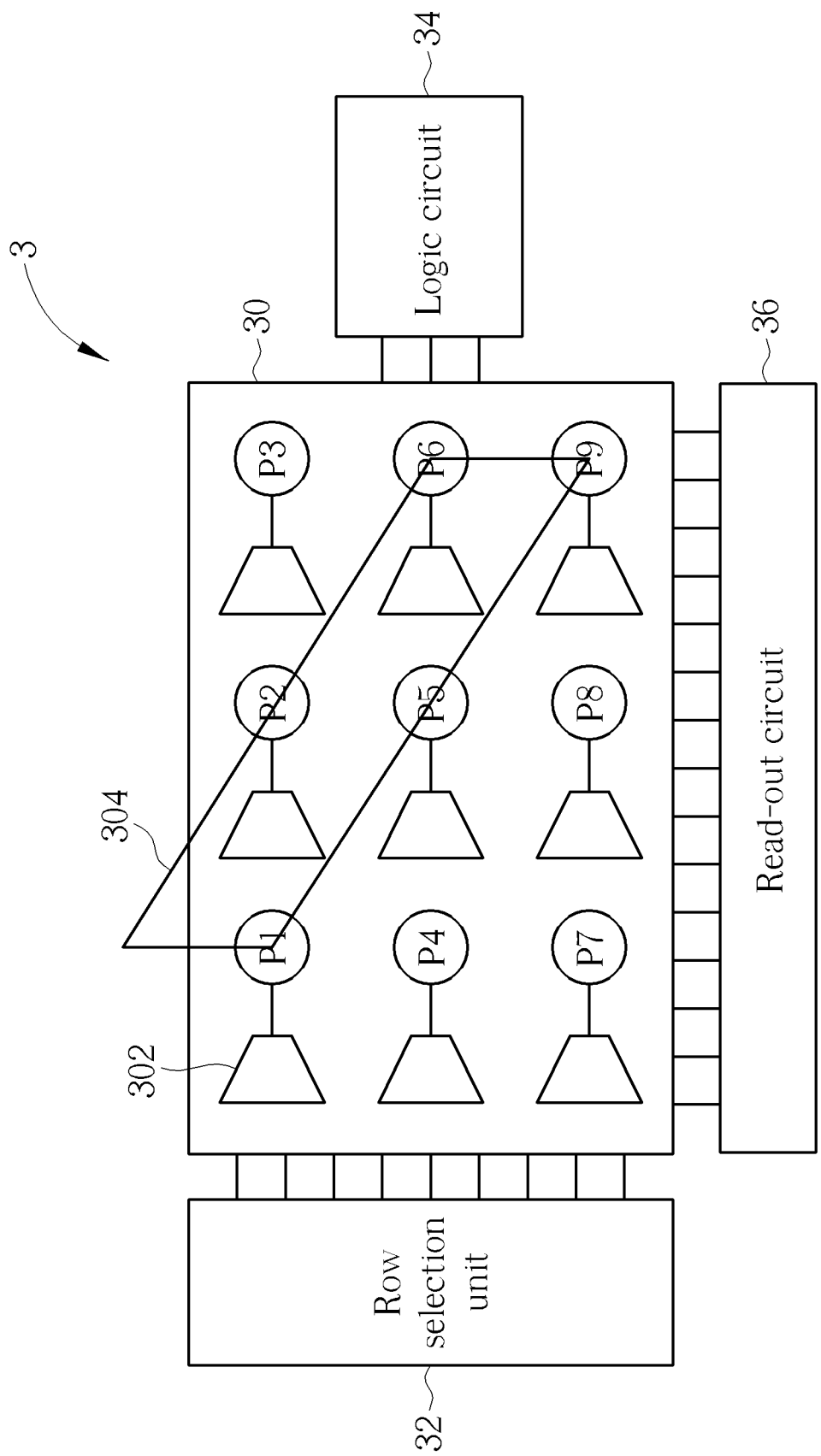
FIG. 5 is a schematic diagram illustrating the pixel array unit shown in FIG. 4 having a 3*3 pixel array.
Figure 6:
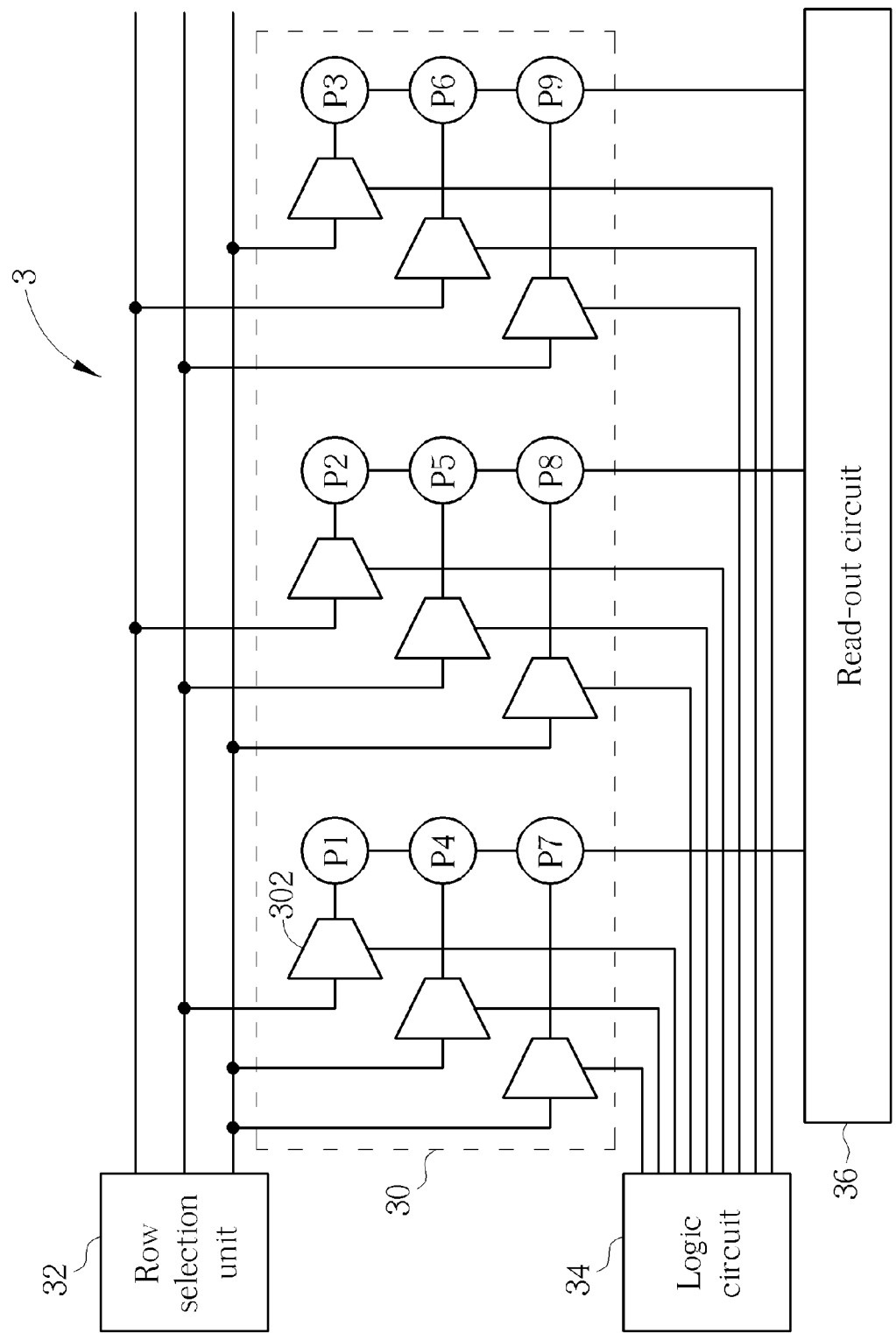
FIG. 6 is a schematic diagram illustrating a circuit of the CMOS image sensor shown in FIG. 5.

Referring to FIG. 5, FIG. 5 is a schematic diagram illustrating the pixel array unit 30 shown in FIG. 4 having a 3*3 pixel array. The 3*3 pixel array shown in FIG. 5 is used, for example, to depict features of the invention. In this embodiment, the pixel array unit 30 comprises the same amount of pixels 300 and multiplexers 302. That is to say, the aforesaid M and P both are equal to 9. Also, referring to FIG. 6, FIG. 6 is a schematic diagram illustrating a circuit of the CMOS image sensor 3 shown in FIG. 5.

When a user uses an object (not shown), such as finger, stylus or the like, to operate an optical positioning system (not shown) equipped with the CMOS image sensor 3, the pixel array unit 30 will sense the object or a moving trajectory thereof. Afterward, the logic circuit 34 determining a sensing region 304 according to the object or the moving trajectory thereof sensed by the pixel array unit 30. As shown in FIG. 5, the sensing region 304 comprises five pixels P1, P2, P5, P6 and P9. That is to say, the aforesaid N and Q both are equal to 5. Then, the logic circuit 34 controls the multiplexers 302, which are electrically connected to the aforesaid five pixels, to transmit the row selection signal to the five pixels and enables the read-out circuit 36 to read signals generated by the five pixels within the sensing region 304 in row-major order. In other words, the red-out circuit 36 will read the pixels P2, P6, P1, P5 and P9 within the sensing region 304 in order. That is to say, the first row read by the read-out circuit 36 includes the pixels P2 and P6 and the second row read by the read-out circuit 36 includes the pixels P1, P5 and P9. In this embodiment, the sensing region 304 is variable and can be set through self-calibration while booting. Furthermore, when the object or the moving trajectory thereof has a random shape, the logic circuit 34 may determine the sensing region as a parallelogram including the object or the moving trajectory thereof so as to prevent the following algorithm from getting complicated.

Figure 7:
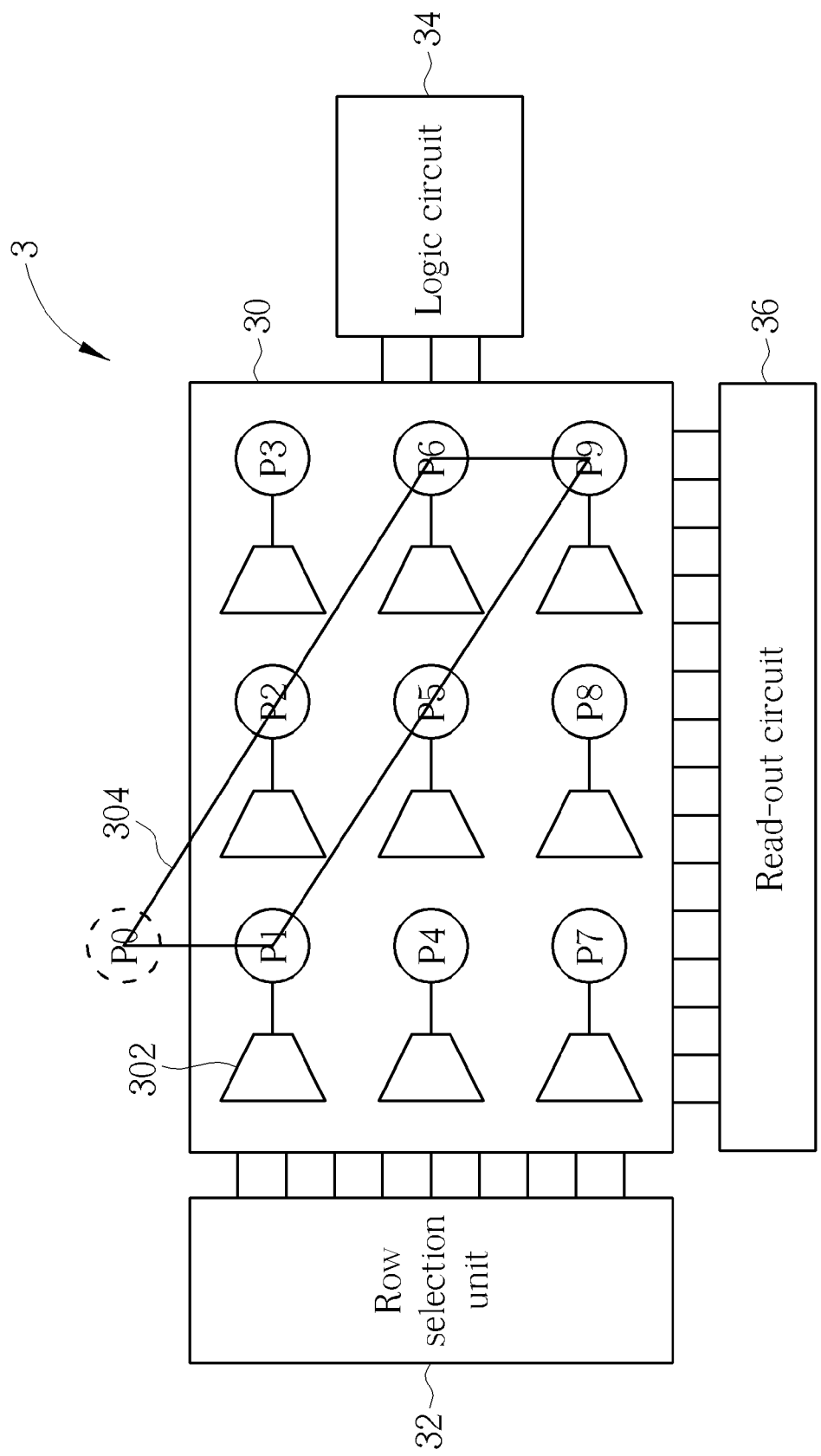
FIG. 7 is a schematic diagram illustrating the sensing region shown in FIG. 5 with a dummy pixel.

It should be noted that because the sensing region 304 shown in FIG. 5 exceeds a real region of the pixel array unit 30, the scanning time may become unstable every time and thus the calculation of exposure time may increase. To solve this problem, the read-out circuit 36 of the invention can add dummy pixel(s) to the sensing region 304 while reading pixel data so as to keep the scanning time inconstant every time and simplify the calculation of exposure time. Referring to FIG. 7, FIG. 7 is a schematic diagram illustrating the sensing region 304 shown in FIG. 5 with a dummy pixel P0. As shown in FIG. 7, after adding the dummy pixel P0, the pixels within the sensing region 304 are arranged as a parallelogram and an amount of pixels in each row is the same. Accordingly, the scanning time can be kept in constant every time.

Figure 8:
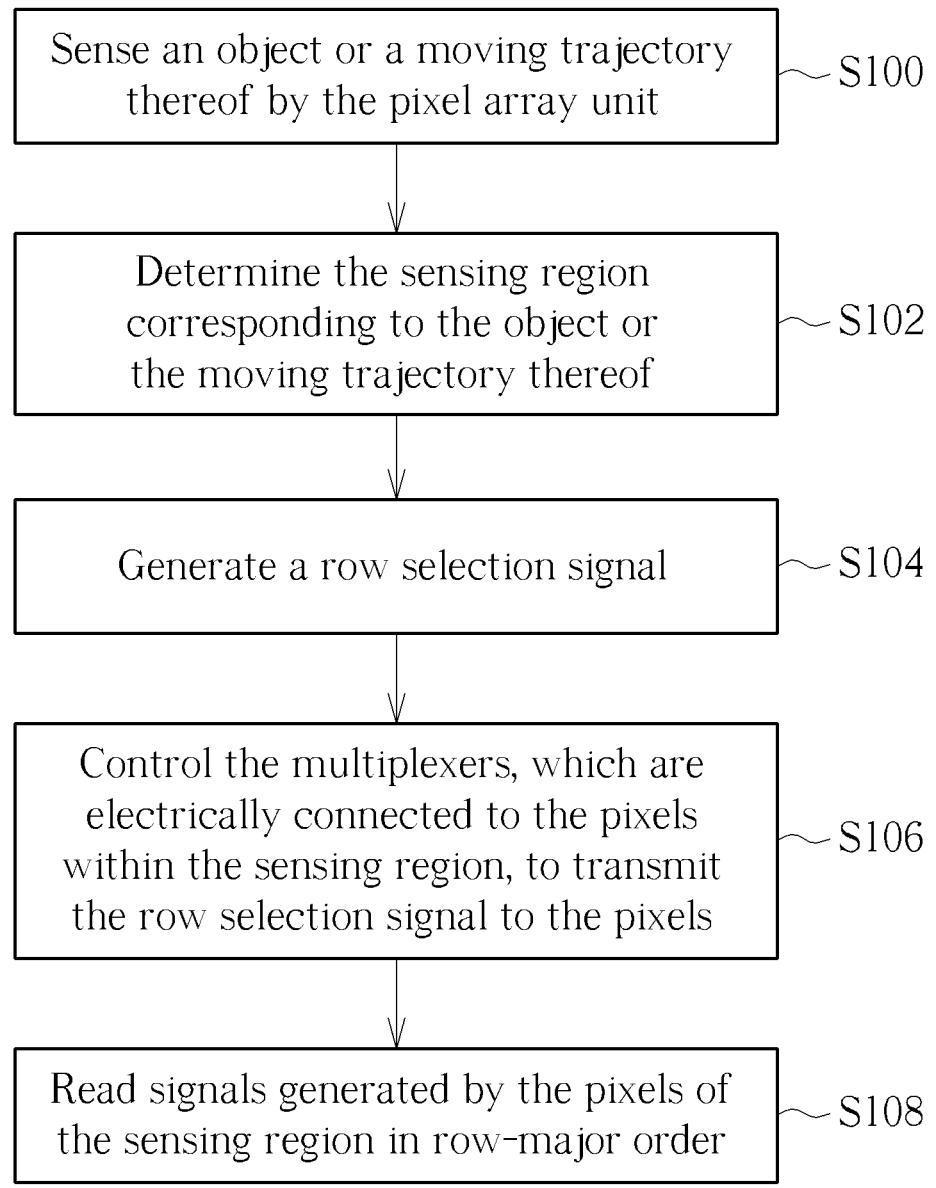
FIG. 8 is a flowchart illustrating a method of operating the CMOS image sensor according to the invention.

Referring to FIG. 8, FIG. 8 is a flowchart illustrating a method of operating the CMOS image sensor according to the invention. Also, referring to FIGS. 4 to 6 along with the aforesaid CMOS image sensor 3, the method of operating the CMOS image sensor of the invention comprises the following steps.

In the beginning, step S100 is performed to sense an object or a moving trajectory thereof by the pixel array unit 30. Afterward, step S102 is performed to determine the sensing region 304 corresponding to the object or the moving trajectory thereof. Step S104 is then performed to generate a row selection signal. Step S106 is then performed to control the multiplexers, which are electrically connected to the pixels P2, P6, P1, P5 and P9 within the sensing region 304, to transmit the row selection signal to the pixels P2, P6, P1, P5 and P9. Finally, step S108 is performed to read signals generated by the pixels P2, P6, P1, P5 and P9 of the sensing region 304 in row-major order.

Figure 9:
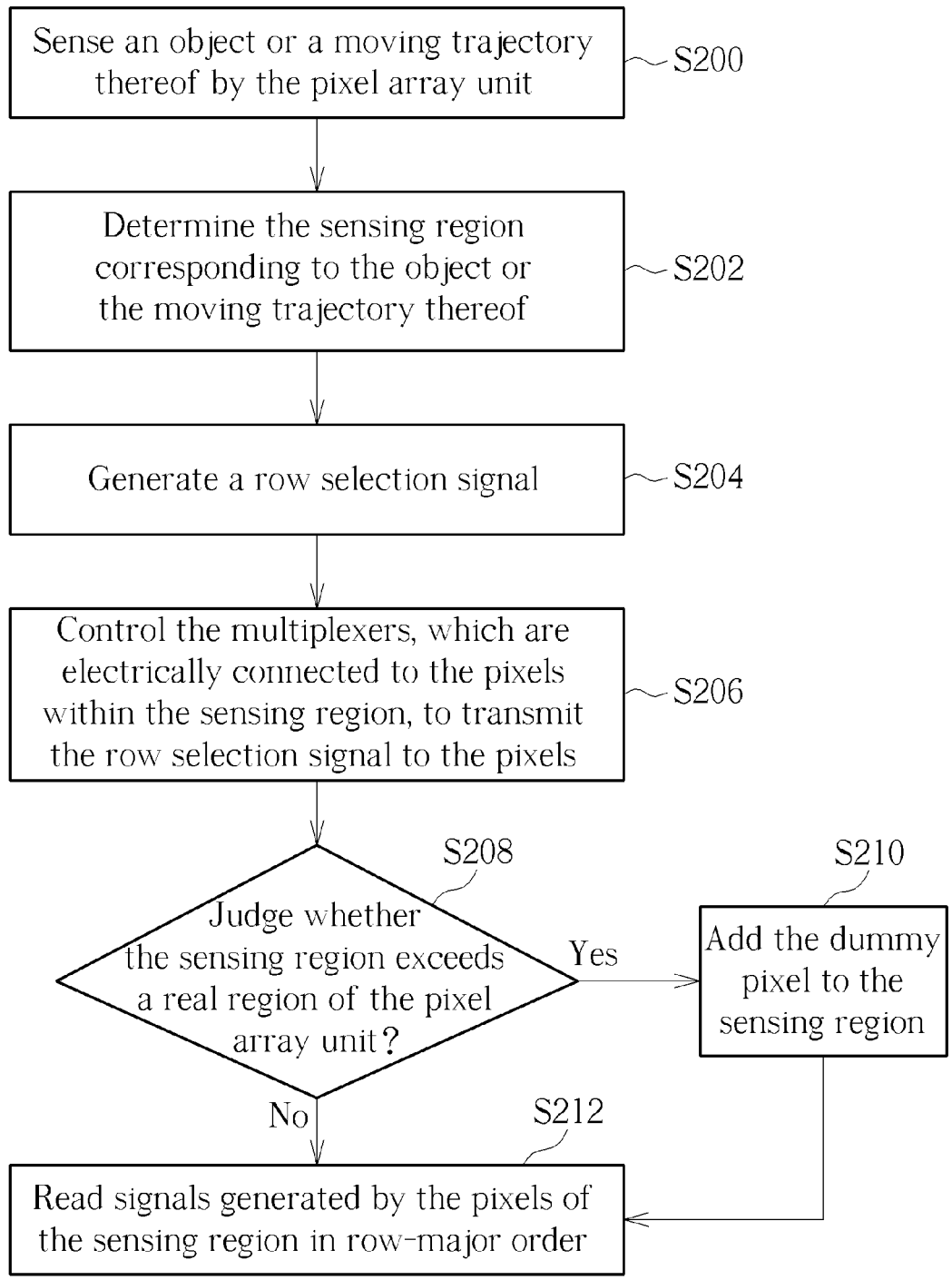
FIG. 9 is a flowchart illustrating a method of operating the CMOS image sensor according to another embodiment of the invention.

Referring to FIG. 9, FIG. 9 is a flowchart illustrating a method of operating the CMOS image sensor according to another embodiment of the invention. Also, referring to FIG. 7 along with the aforesaid CMOS image sensor 3, the method of operating the CMOS image sensor of the invention comprises the following steps once the sensing region 304 exceeds a real region of the pixel array unit 30.

In the beginning, step S200 is performed to sense an object or a moving trajectory thereof by the pixel array unit 30. Afterward, step S202 is performed to determine the sensing region 304 corresponding to the object or the moving trajectory thereof. Step S204 is then performed to generate a row selection signal. Step S206 is then performed to control the multiplexers, which are electrically connected to the pixels P2, P6, P1, P5 and P9 within the sensing region 304, to transmit the row selection signal to the pixels P2, P6, P1, P5 and P9. Step S208 is then performed to judge whether the sensing region 304 exceeds a real region of the pixel array unit 30, and step S210 is then performed if it is YES, otherwise, step S212 is performed. Step 210 is performed to add the dummy pixel P0 to the sensing region 304. Step S212 is performed to read signals generated by the dummy pixel P0, if any, and the pixels P2, P6, P1, P5 and P9 of the sensing region 304 in row-major order.

Figure 10:
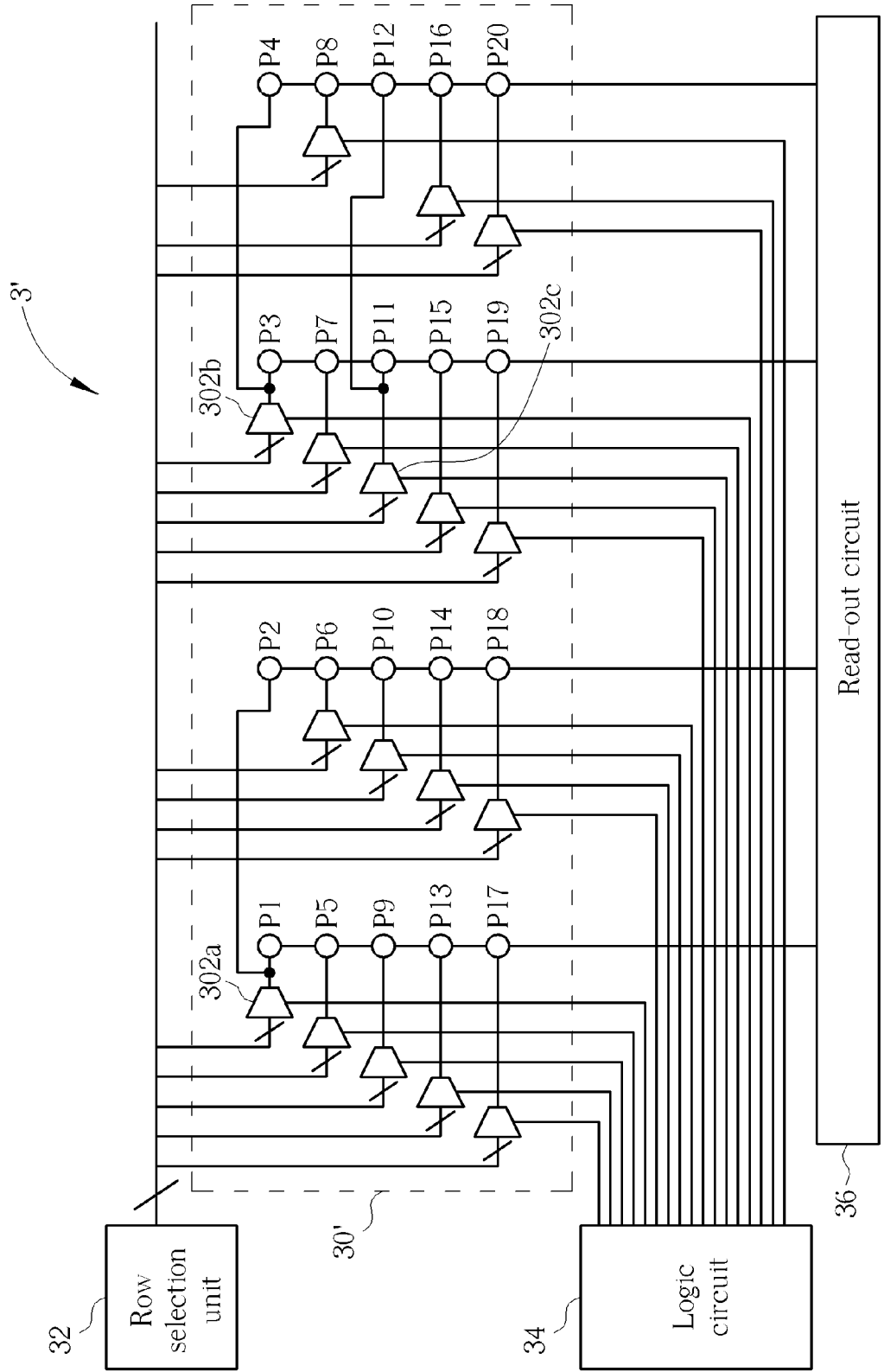
FIG. 10 is a schematic diagram illustrating a circuit of a CMOS image sensor according to another embodiment of the invention.

Referring to FIG. 10, FIG. 10 is a schematic diagram illustrating a circuit of a CMOS image sensor 3' according to another embodiment of the invention. As shown in FIG. 10, the CMOS image sensor 3' comprises a pixel array unit 30', a row selection unit 32, a logic circuit 34 and a read-out circuit 36 wherein the principles of the row selection unit 32, the logic circuit 34 and the read-out circuit 36 are the same as those mentioned in the above and will not be described in detail here. In this embodiment, the pixel array unit 30' has a 4*5 pixel array. In other words, the pixel array unit 30' comprises twenty pixels P1-P20. Compared to the pixel array unit 30 shown in FIG. 6, an amount of the multiplexers of the pixel array unit 30' is less than that of the pixels. As shown in FIG. 10, the pixel array unit 30' comprises seventeen multiplexers wherein the pixels P1 and P2 are electrically connected to one single multiplexer 302a, the pixels P3 and P4 are electrically connected to one single multiplexer 302b, and the pixels P11 and P12 are electrically connected to one single multiplexer 302c. That is to say, the invention may utilize one multiplexer to control more than one pixel simultaneously so as to reduce the amount of multiplexers. The amount of pixels, which are electrically to one single multiplexer, can be determined based on practical applications and is not limited to two as shown in FIG. 10. It should be noted that if there are at least two pixels electrically connected to one single multiplexer, the at least two pixels are located at different columns of the pixel array unit 30'. As shown in FIG. 10, the pixels P1 and P2 are located at different columns, the pixels P3 and P4 are located at different columns, and the pixels P11 and P12 are located at different columns. Preferably, the pixels, which are electrically connected to one single multiplexer, may be, but not limited to, located at one row of the pixel array unit 30'. As shown in FIG. 10, the pixels P1 and P2 are located at one row, the pixels P3 and P4 are located at one row, and the pixels P11 and P12 are located at one row.

Figure 11:
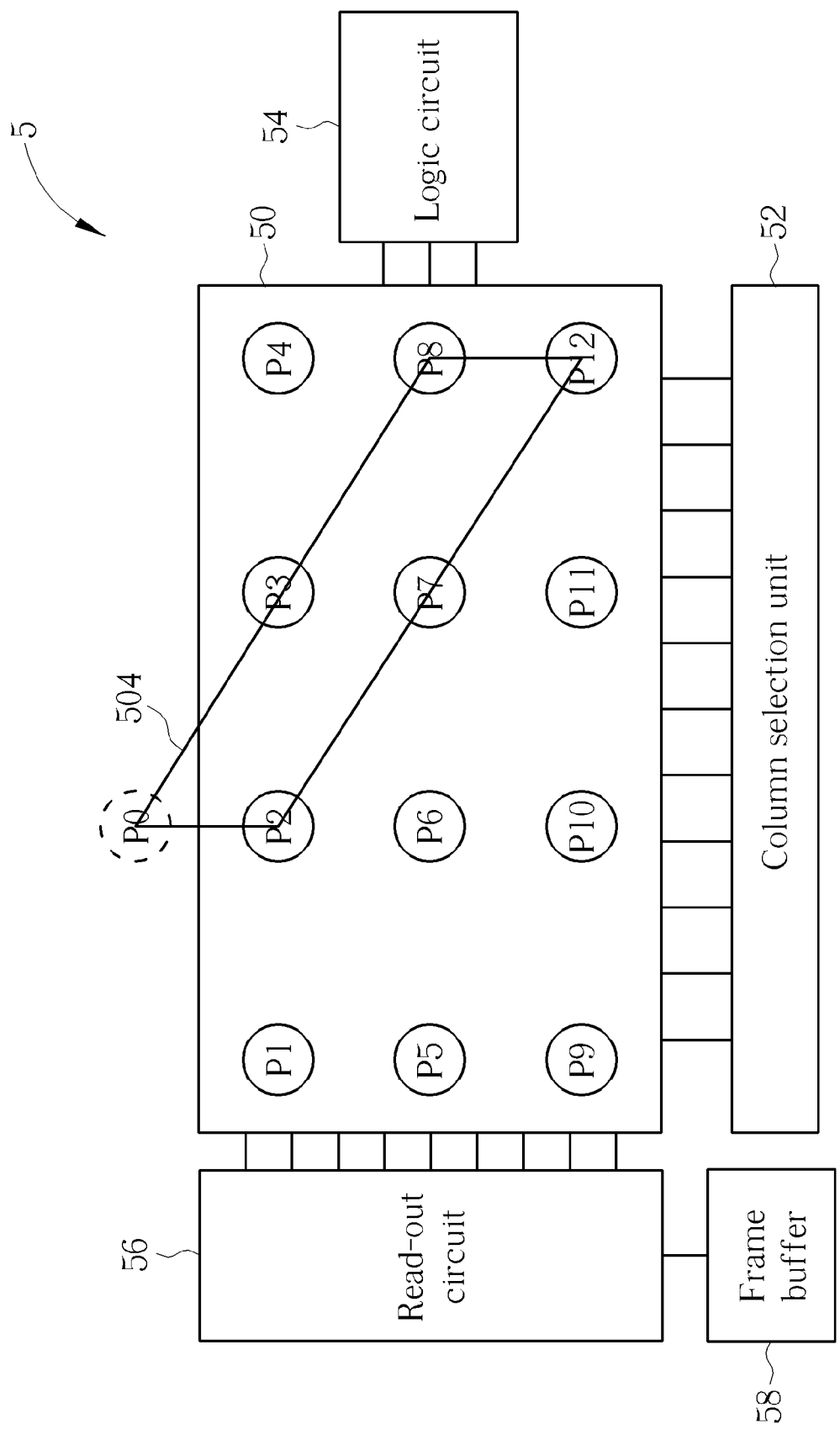
FIG. 11 is a schematic diagram illustrating a CMOS image sensor according to another embodiment of the invention.
Figure 12:
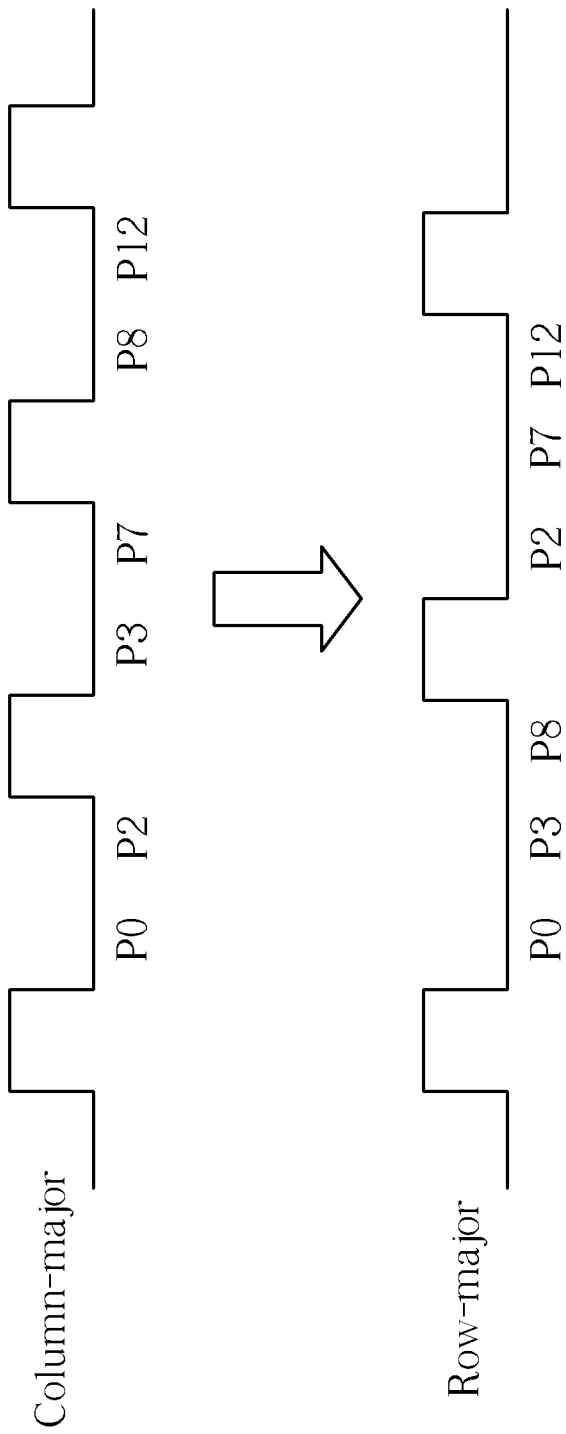
FIG. 12 is a time sequence diagram illustrating reading order of pixel data.

Referring to FIGS. 11 and 12, FIG. 11 is a schematic diagram illustrating a CMOS image sensor 5 according to another embodiment of the invention, and FIG. 12 is a time sequence diagram illustrating reading order of pixel data. As shown in FIG. 11, the CMOS image sensor 5 comprises a pixel array unit 50, a column selection unit 52, a logic circuit 54, a read-out circuit 56 and a frame buffer 58. The column selection unit 52, the logic circuit 54 and the read-out circuit 56 are electrically connected to the pixel array unit 50, and the frame buffer 58 is electrically connected to the read-out circuit 56. The 4*3 pixel array shown in FIG. 11 is used for illustrative purpose only and the invention is not limited to that manner. The pixels P1-P12 can absorb light reflected from an object and then transform the absorbed light into an electric signal. The pixels P1-P12 usually consist of transistors and photo diodes. It should be noted that the structure and principle of the pixels P1-P12 can be easily achieved by one skilled in the art and thus will not be described in detail here.

The column selection unit 52 receives a time sequence signal and a control signal from a controller (not shown) and generates a column selection signal. The column selection signal is used for controlling the pixels P1-P12 of the pixel array unit 50 to output data. The logic circuit 54 is used for determining a sensing region corresponding to an object or a moving trajectory thereof sensed by the pixel array unit 50. The read-out circuit 56 reads signals generated by the pixels of the sensing region in column-major order. Afterward, the frame buffer transforms the output data from column-major order to row-major order.

For example, when a user uses an object (not shown), such as finger, stylus or the like, to operate an optical positioning system (not shown) equipped with the CMOS image sensor 5, the pixel array unit 50 will sense the object or a moving trajectory thereof. Afterward, the logic circuit 54 determines a sensing region 504 corresponding to the object or the moving trajectory thereof sensed by the pixel array unit 50. As shown in FIG. 11, the sensing region 504 comprises five pixels P2, P3, P7, P8 and P12. It should be noted that because the sensing region 504 shown in FIG. 11 exceeds a real region of the pixel array unit 50, the scanning time may become unstable every time and thus the calculation of exposure time may increase. To solve this problem, the read-out circuit 56 of the invention can add a dummy pixel P0 to the sensing region 504 while reading pixel data so as to keep the scanning time in constant every time and simplify the calculation of exposure time.

Based on the column selection signal generated by the column selection unit 52, the read-out circuit 56 reads signals generated by the pixels of the sensing region 504 in column-major order wherein the reading order is as follows, P0, P2, P3, P7, P8 and P12. Afterward, the frame buffer 58 transforms the output data form column-major order to row-major order. As shown in FIG. 12, after being transformed by the frame buffer 58, the reading order is changed to be as follows, P0, P3, P8, P2, P7 and P12. Furthermore, in this embodiment, since the scanning line is not orthogonal to the contour of the object, the scanning result may show an oblique contour. The invention utilizes the frame buffer 58 to rearrange the pixel data so as to improve the aforesaid problem.

Figure 13:
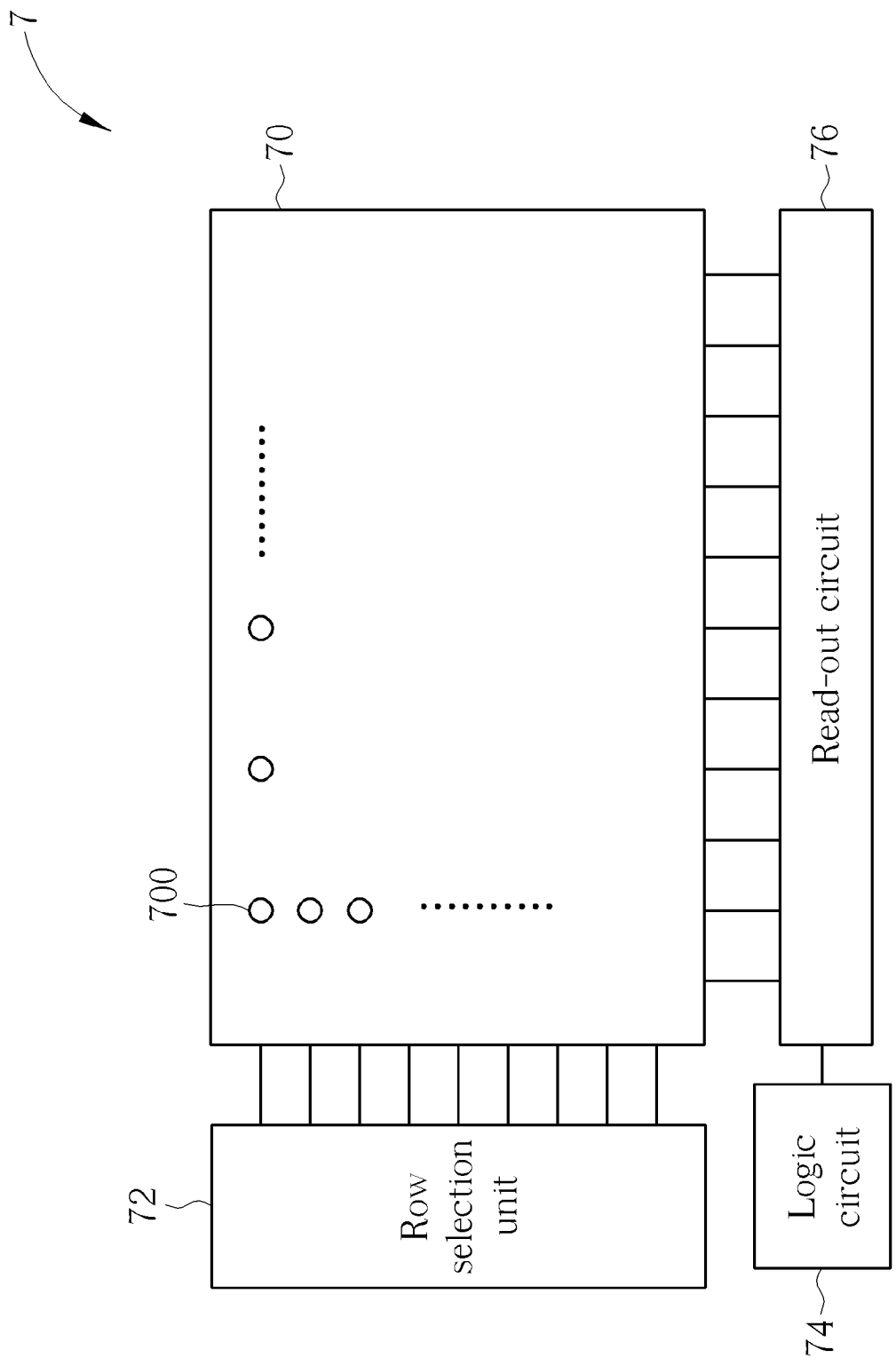
FIG. 13 is a schematic diagram illustrating a CMOS image sensor according to another embodiment of the invention.

Referring to FIG. 13, FIG. 13 is a schematic diagram illustrating a CMOS image sensor 7 according to another embodiment of the invention. As shown in FIG. 13, the CMOS image sensor 7 comprises a pixel array unit 70, a row selection unit 72, a logic circuit 74 and a read-out circuit 76. The row selection unit 72 and the read-out circuit 76 are electrically connected to the pixel array unit 70. The logic circuit 74 is electrically connected to the read-out circuit 76.

The pixel array unit 70 is used for sensing an object (not shown) or a moving trajectory thereof. In this embodiment, the pixel array unit 70 comprises M pixels 700 wherein M is a positive integer. In addition, the pixel 700 can absorb light reflected from an object and then transform the absorbed light into an electric signal. The pixel 700 usually consists of transistors and photo diodes. It should be noted that the structure and principle of the pixel 700 can be easily achieved by one skilled in the art and thus will not be described in detail here.

The row selection unit 72 receives a time sequence signal and a control signal from a controller (not shown) and then generates a row selection signal. The row selection signal is used for controlling the pixels 700 of the pixel array unit 70 to output data. The read-out circuit 76 reads signals generated by the pixels 700 of the pixel array unit 70. The logic circuit 74 is used for determining a sensing region corresponding to the object or the moving trajectory thereof wherein the sensing region comprises N of the M pixels 700 and N is a positive integer smaller than or equal to M. Afterward, the logic circuit 74 determines a first pixel and a last pixel for each row within the sensing region and controls the read-out circuit 76 to read the first pixel through the last pixel of each row in row-major order, so as to output signals generated by the N pixels.

Figure 14:
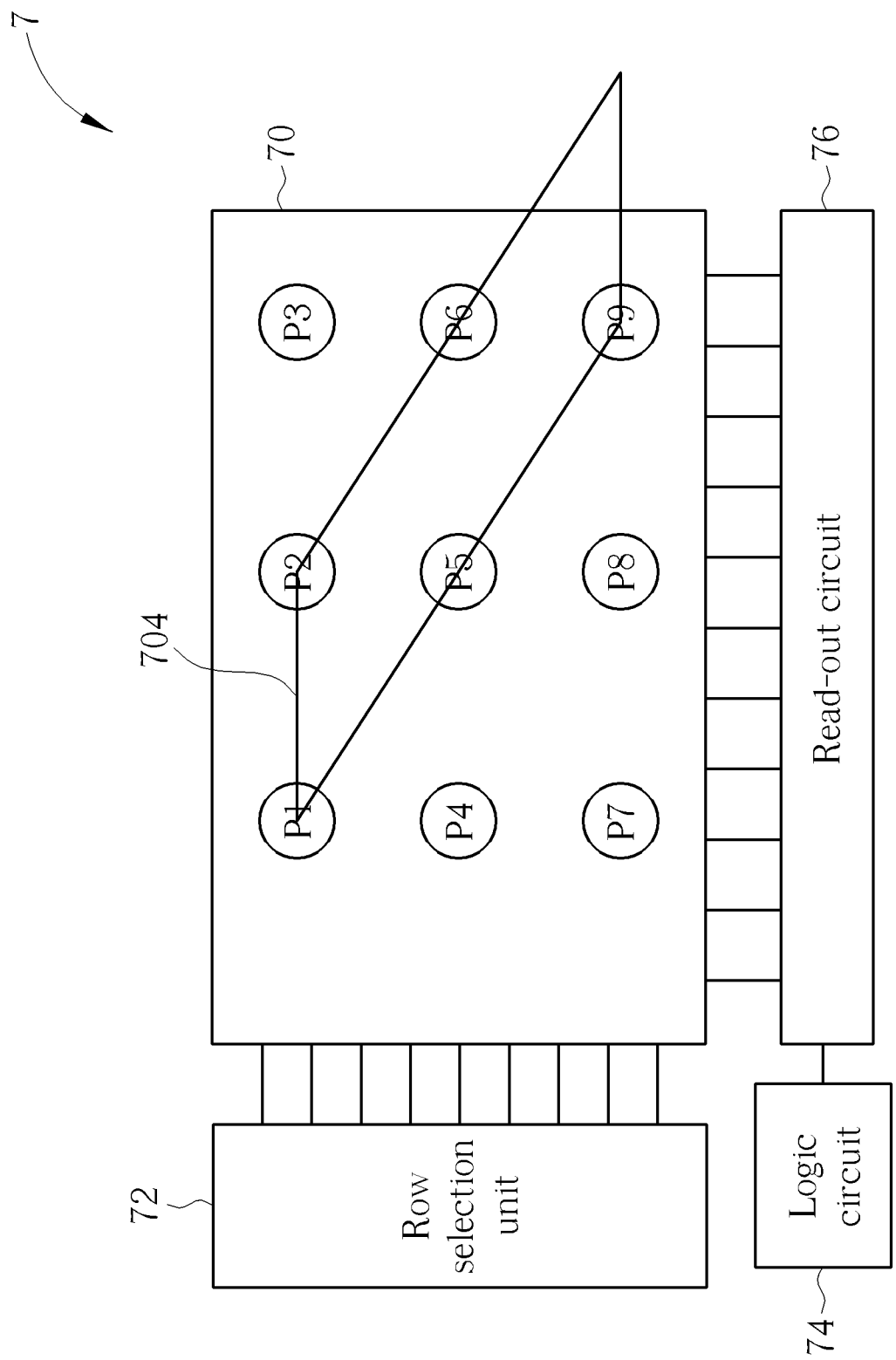
FIG. 14 is a schematic diagram illustrating the pixel array unit shown in FIG. 13 having a 3*3 pixel array.
Figure 15:
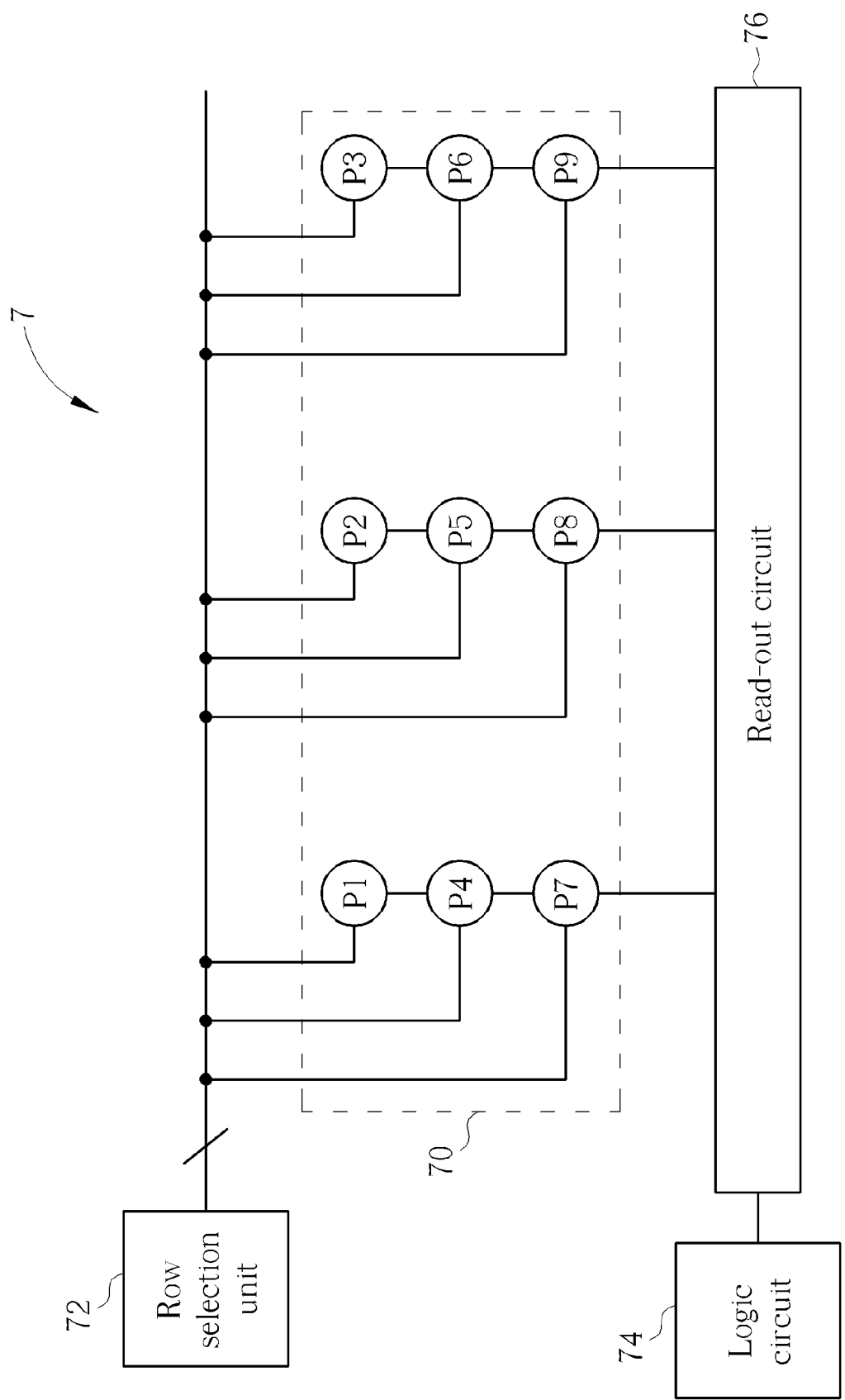
FIG. 15 is a schematic diagram illustrating a circuit of the CMOS image sensor shown in FIG. 14.

Referring to FIGS. 14 and 15, FIG. 14 is a schematic diagram illustrating the pixel array unit 70 shown in FIG. 13 having a 3*3 pixel array, and FIG. 15 is a schematic diagram illustrating a circuit of the CMOS image sensor 7 shown in FIG. 14. The 3*3 pixel array shown in FIGS. 14 and 15 is used, for example, to depict features of the invention.

When a user uses an object (not shown), such as finger, stylus or the like, to operate an optical positioning system (not shown) equipped with the CMOS image sensor 7, the pixel array unit 70 will sense the object or a moving trajectory thereof. Afterward, the logic circuit 74 determining a sensing region 704 according to the object or the moving trajectory thereof sensed by the pixel array unit 70. As shown in FIG. 14, the sensing region 704 comprises five pixels P1, P2, P5, P6 and P9. That is to say, the aforesaid N is equal to 5. Furthermore, the pixels P1 and P2 are located at the first row, the pixels P5 and P6 are located at the second row, and the pixel P9 is located at the third row. Then, the logic circuit 74 determines a first pixel and a last pixel for each row within the sensing region 704. As shown in FIG. 14, for the first row within the sensing region 704, the first pixel is P1 and the last pixel is P2; for the second row within the sensing region 704, the first pixel is P5 and the last pixel is P6; and for the third row within the sensing region 704, the first pixel is P9 and the last pixel is also P9. Then, the logic circuit 74 controls the read-out circuit 76 to read the first pixel through the last pixel of each row in row-major order, so as to output signals generated by the five pixels within the sensing region 704. In this embodiment, the red-out circuit 76 will read the pixels P1, P2, P5, P6 and P9 within the sensing region 704 in order.

In this embodiment, the sensing region 704 is variable and can be set through self-calibration while booting. Furthermore, when the object or the moving trajectory thereof has a random shape, the logic circuit 74 may determine the sensing region as a parallelogram including the object or the moving trajectory thereof so as to prevent the following algorithm from getting complicated.

Figure 16:
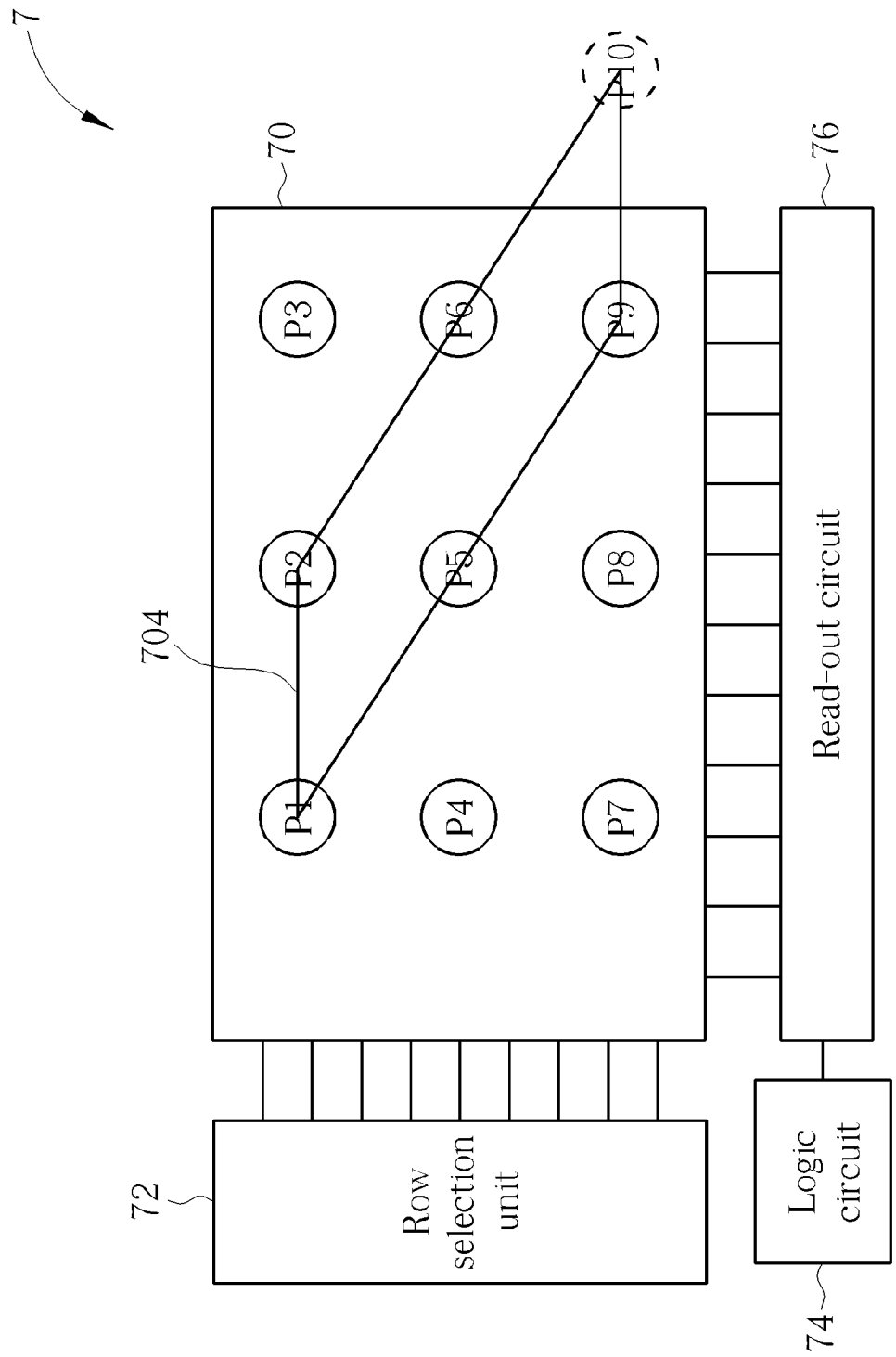
FIG. 16 is a schematic diagram illustrating the sensing region shown in FIG. 14 with a dummy pixel.

It should be noted that because the sensing region 704 shown in FIG. 14 exceeds a real region of the pixel array unit 70, the scanning time may become unstable every time and thus the calculation of exposure time may increase. To solve this problem, the read-out circuit 76 of the invention can add dummy pixel(s) to the sensing region 704 while reading pixel data so as to keep the scanning time in constant every time and simplify the calculation of exposure time. Referring to FIG. 16, FIG. 16 is a schematic diagram illustrating the sensing region 704 shown in FIG. 14 with a dummy pixel P10. As shown in FIG. 16, after adding the dummy pixel P10, the pixels within the sensing region 704 are arranged as a parallelogram and an amount of pixels in each row is the same. Accordingly, the scanning time can be kept in constant every time. At this time, for the third row within the sensing region 704, the first pixel is P9 and the last pixel is the dummy pixel P10.

Figure 17:
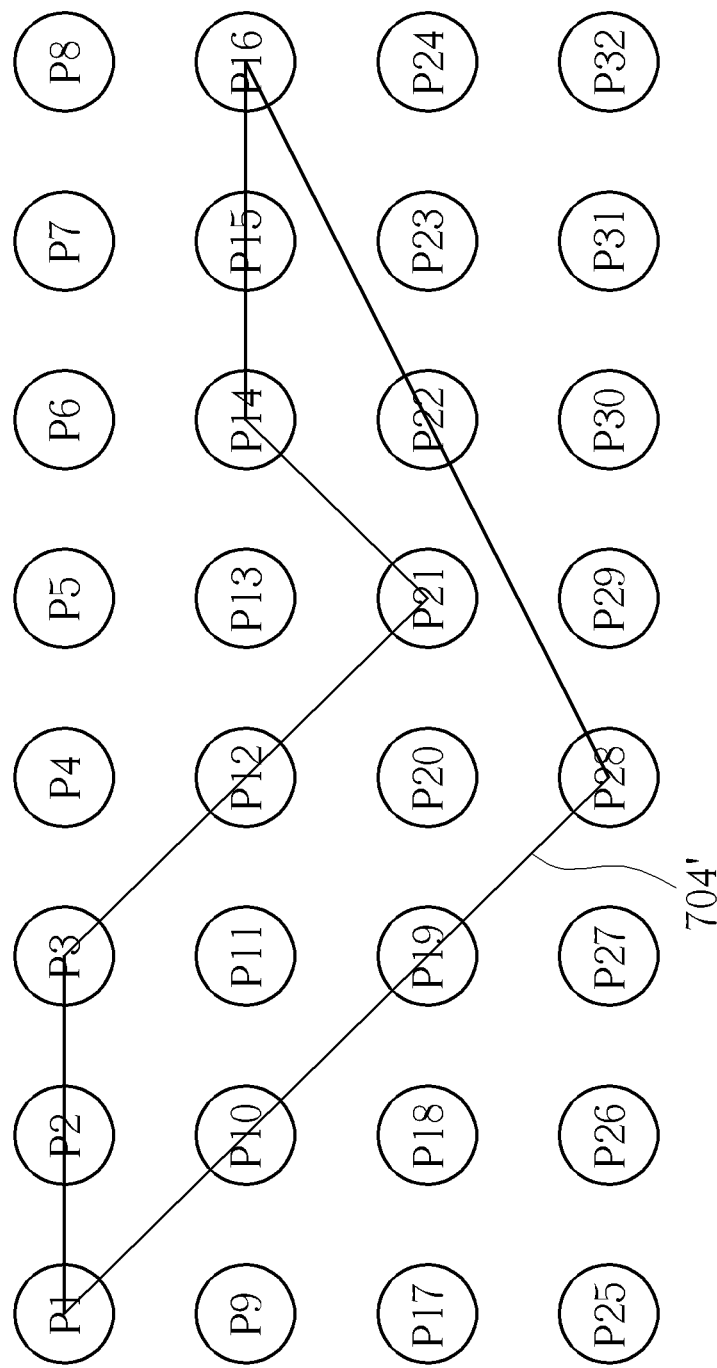
FIG. 17 is a schematic diagram illustrating a sensing region according to another embodiment of the invention.

Referring to FIG. 17, FIG. 17 is a schematic diagram illustrating a sensing region 704' according to another embodiment of the invention. Besides the aforesaid parallelogram, the read-out circuit 76 of the invention may also read and output pixel data within the sensing region 704' shown in FIG. 17 through appropriate setting. It should be noted that since the second row within the sensing region 704' includes six pixels P10, P11, P12, P14, P15 and P16 and there is a break between the pixels P10, P11, P12 and the other pixels P14, P15, P16, the logic circuit 74 will determine a first pixel and a last pixel for the pixels P10, P11, P12 and determine another first pixel and another last pixel for the pixels P14, P15, P16. In other words, for the pixels P10, P11, P12, the first pixel is P10 and the last pixel is P12; and for the pixels P14, P15, P16, the first pixel is P14 and the last pixel is P16. Therefore, for the second row shown in FIG. 17, the read-out circuit 76 will read the first pixel P10 through the last pixel P12 first and then read another first pixel P14 through another last pixel P16. That is to say, the pixels within each row read by the read-out circuit 76 can be continuous or non-continuous, and it depends on the sensing region.

Figure 18:
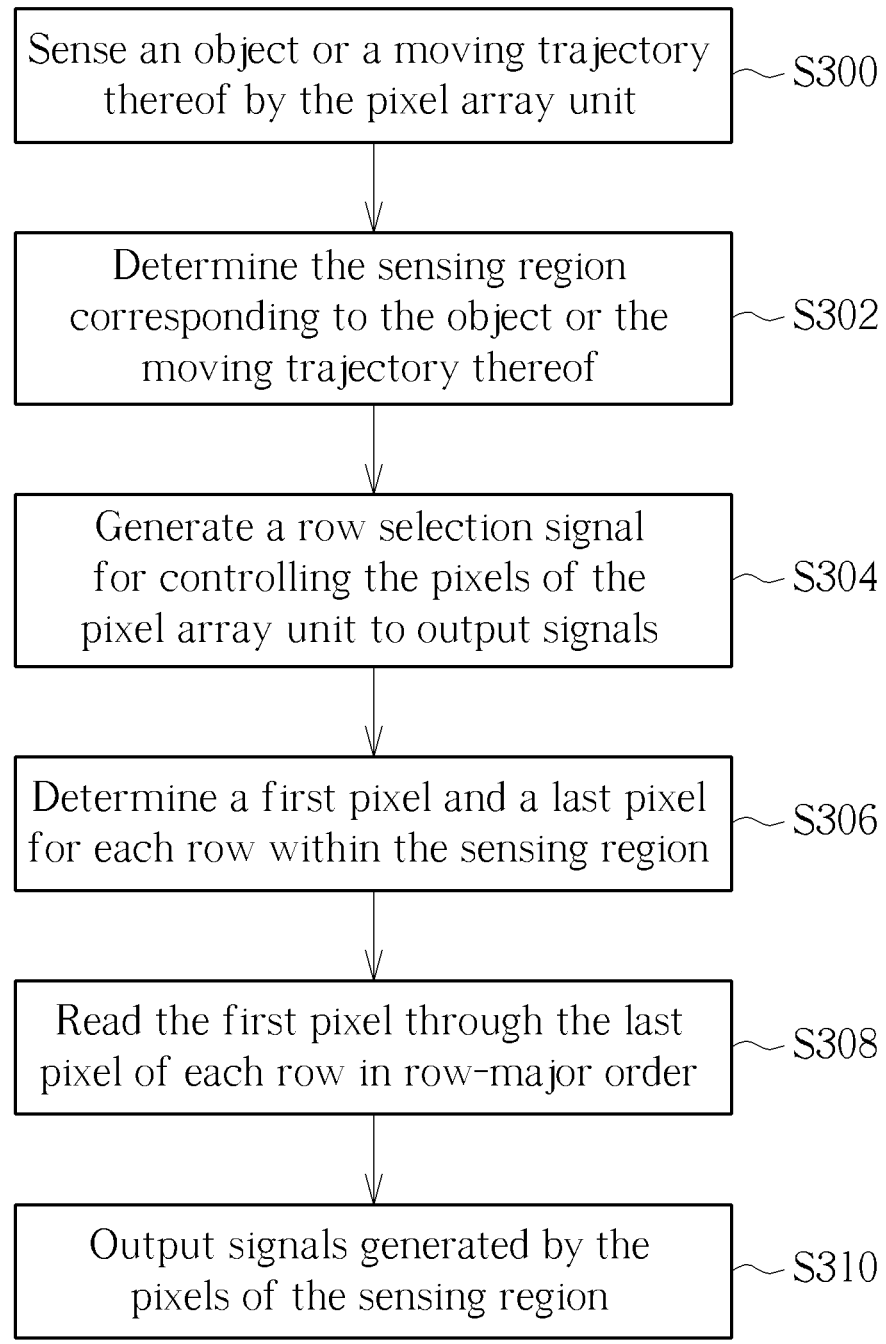
FIG. 18 is a flowchart illustrating a method of operating the CMOS image sensor according to another embodiment of the invention.

Referring to FIG. 18, FIG. 18 is a flowchart illustrating a method of operating the CMOS image sensor according to another embodiment of the invention. Also, referring to FIGS. 13 to 15 along with the aforesaid CMOS image sensor 7, the method of operating the CMOS image sensor of the invention comprises the following steps.

In the beginning, step S300 is performed to sense an object or a moving trajectory thereof by the pixel array unit 70. Afterward, step S302 is performed to determine the sensing region 704 corresponding to the object or the moving trajectory thereof. Step S304 is then performed to generate a row selection signal for controlling the pixels of the pixel array unit 70 to output signals. Step S306 is then performed to determine a first pixel and a last pixel for each row within the sensing region 704. Step S308 is then performed to read the first pixel through the last pixel of each row in row-major order. Finally, step S310 is performed to output signals generated by the pixels P1, P2, P5, P6 and P9 of the sensing region 704.

Figure 19:
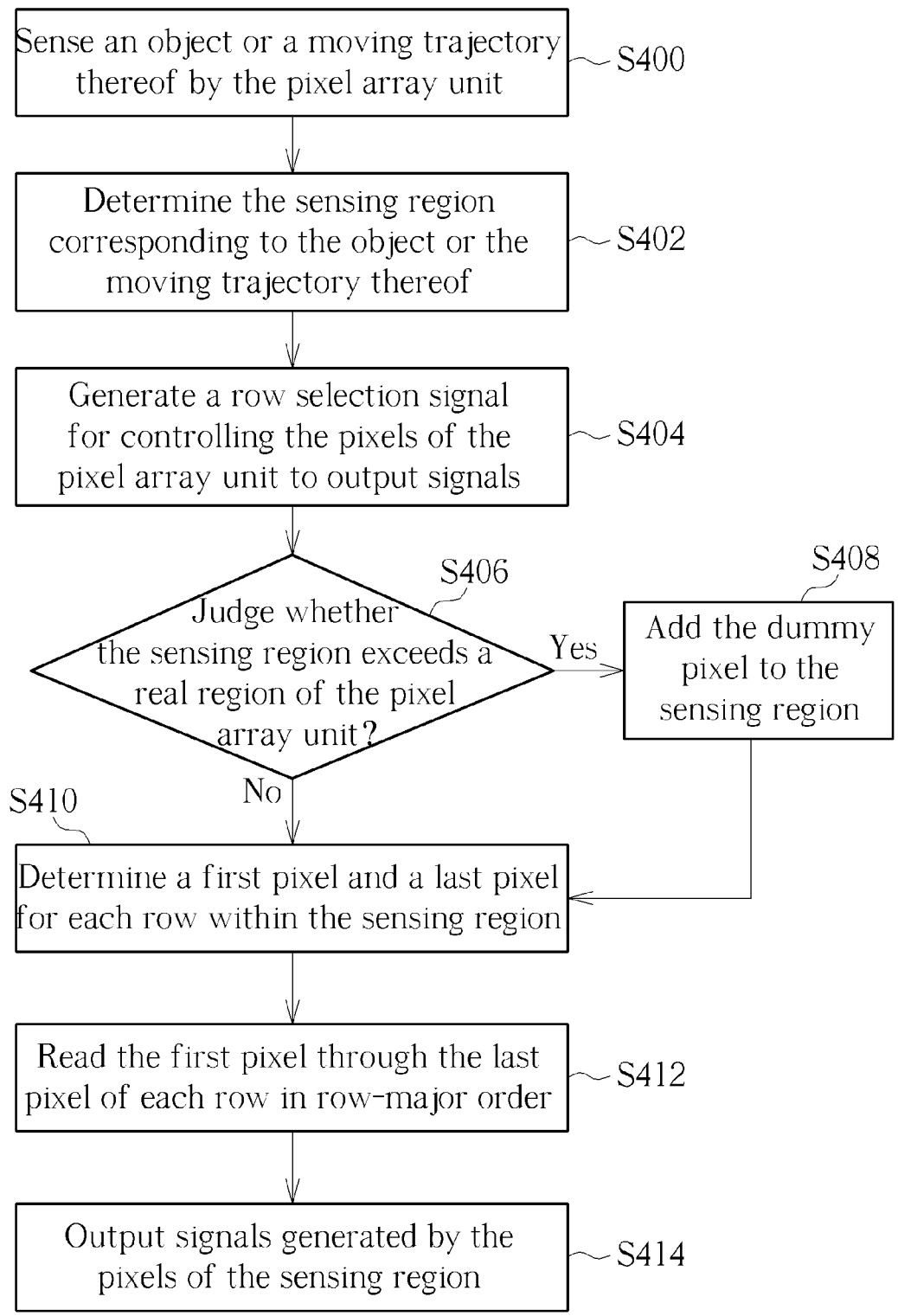
FIG. 19 is a flowchart illustrating a method of operating the CMOS image sensor according to another embodiment of the invention.

Referring to FIG. 19, FIG. 19 is a flowchart illustrating a method of operating the CMOS image sensor according to another embodiment of the invention. Also, referring to FIG. 16 along with the aforesaid CMOS image sensor 7, the method of operating the CMOS image sensor of the invention comprises the following steps once the sensing region 704 exceeds a real region of the pixel array unit 70.

In the beginning, step S400 is performed to sense an object or a moving trajectory thereof by the pixel array unit 70. Afterward, step S402 is then performed to determine the sensing region 704 corresponding to the object or the moving trajectory thereof. Step S404 is then performed to generate a row selection signal for controlling the pixels of the pixel array unit 70 to output signals. Step S406 is then performed to judge whether the sensing region 704 exceeds a real region of the pixel array unit 70, and step S408 is then performed if it is YES, otherwise, step S410 is performed. Step 408 is performed to add the dummy pixel P10 to the sensing region 704. Step S410 is performed to determine a first pixel and a last pixel for each row within the sensing region 704. Step S412 is then performed to read the first pixel through the last pixel of each row in row-major order. Finally, step S414 is performed to output signals generated by the pixels P1, P2, P5, P6, P9 and the dummy pixel P0, if any, of the sensing region 704.

Compared to the prior art, the invention utilizes multiplexers to control output of pixel data. The logic circuit can control the multiplexers to define a slope of scanning line selected by each row selection signal. Furthermore, the invention can read the pixel data of the sensing region in column-major order first and then transform the output data from column-major order to row-major order by using the frame buffer. Moreover, the invention may add a logic circuit to the read-out circuit and utilize the logic circuit to determine a starting point (i.e. the aforesaid first pixel) and a terminal point (i.e. the aforesaid last pixel) for each row within the sensing region corresponding to the sensed object or the moving trajectory thereof, so as to control the read-out circuit to output the pixel data within the sensing region. Since the invention only needs to output pixel data within the sensing region corresponding to the object or the moving trajectory thereof, the operating frequency and power consumption can be reduced substantially. Moreover, once the logic circuit judges that the sensing region exceeds the real region of the pixel array unit, the read-out circuit can add dummy pixel(s) to the sensing region so as to keep the scanning time in constant every time and simplify the calculation of exposure time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A CMOS image sensor comprising:
a pixel array unit for sensing an object, the pixel array unit comprising M pixels and P multiplexers, each of the M pixels being electrically connected to one of the P multiplexers wherein M is a positive integer and P is a positive integer;
a row selection unit, electrically connected to the P multiplexers, for generating a row selection signal; and
a logic circuit, electrically connected to the P multiplexers, for determining a sensing region having rows of pixels that directly correspond to a position of the object, wherein the sensing region has a non-rectangular shape and comprises N of the M pixels, and N is a positive integer smaller than or equal to M, the logic circuit controlling Q multiplexers, which are electrically connected to the N pixels, to transmit the row selection signal to the N pixels, such that at least two rows of the sensing region have different numbers of pixels, at least one row of the sensing region has two pixel groups, each pixel group has a plurality of pixels adjacent to each other, each pixel group does not overlap with another pixel group of the sensing region, and each pixel group is not adjacent to another pixel of the sensing region in the same row, wherein Q is a positive integer smaller than or equal to N and smaller than or equal to P.

2. The CMOS image sensor of claim 1, further comprising a read-out circuit, electrically connected to the pixel array unit, for reading signals generated by the N pixels of the sensing region.

3. The CMOS image sensor of claim 2, wherein the read-out circuit reads the signals generated by the N pixels of the sensing region in row-major order.

4. The CMOS image sensor of claim 1, wherein at least two of the M pixels are electrically connected to one of the P multiplexers simultaneously and the at least two pixels are located at different columns of the pixel array unit.

5. The CMOS image sensor of claim 4, wherein the at least two pixels are located at one row of the pixel array unit.

6. A method of operating a CMOS image sensor comprising steps of:
sensing an object by a pixel array unit, the pixel array unit comprising M pixels and P multiplexers, each of the M pixels being electrically connected to one of the P multiplexers wherein M is a positive integer and P is a positive integer;
determining a sensing region having rows of pixels that directly correspond to a position of the object, wherein the sensing region has a non-rectangular shape and, comprises N of the M pixels, and N is a positive integer smaller than or equal to M;
generating a row selection signal; and
controlling Q multiplexers, which are electrically connected to the N pixels, to transmit the row selection signal to the N pixels, such that at least two rows of the sensing region have different numbers of pixels, at least one row of the sensing region has two pixel groups, each pixel group has a plurality of pixels adjacent to each other, each pixel group does not overlap with another pixel group of the sensing region, and each pixel group is not adjacent to another pixel of the sensing region in the same row, wherein Q is a positive integer smaller than or equal to N and smaller than or equal to P.

7. The method of claim 6, further comprising step of reading signals generated by the N pixels of the sensing region in row-major order.

8. The method of claim 6, wherein at least two of the M pixels are electrically connected to one of the P multiplexers simultaneously and the at least two pixels are located at different columns of the pixel array unit.

9. The method of claim 8, wherein the at least two pixels are located at one row of the pixel array unit.

* * * * *